May 5, 1970 D. J. McIVER ET AL 3,510,861
BIN LEVEL INDICATOR
Filed Nov. 7, 1967 2 Sheets-Sheet 1
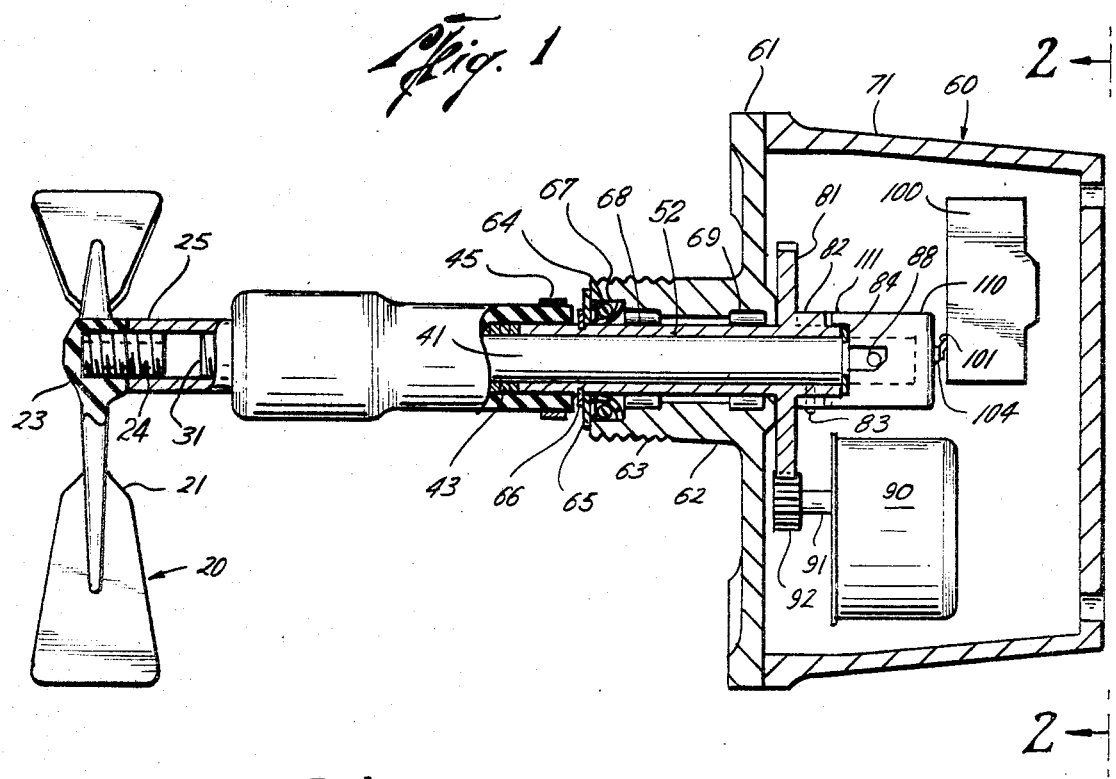
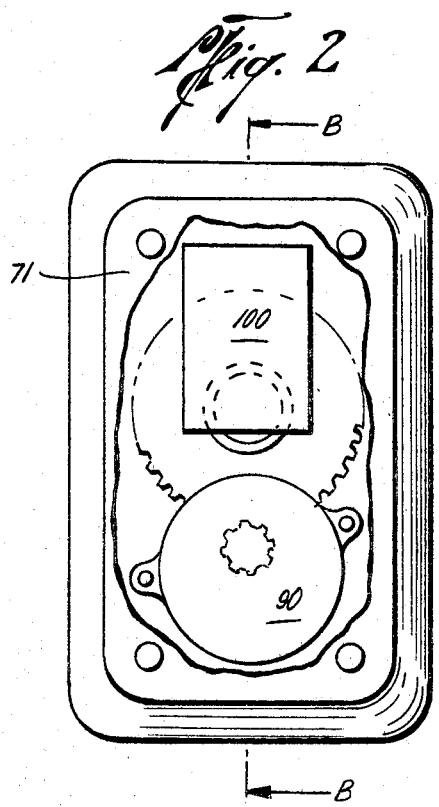
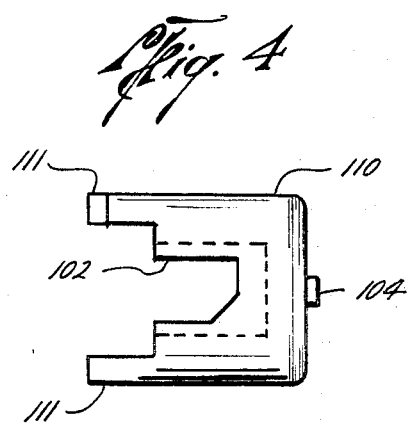
Donald J. McIver
Russell D. McClaid, Jr.
INVENTORS
BY Robert W B Dickerson
ATTORNEY May 5, 1970   D. J. McIVER ET AL   3,510,861
BIN LEVEL INDICATOR
Filed Nov. 7, 1967   2 Sheets-Sheet 2
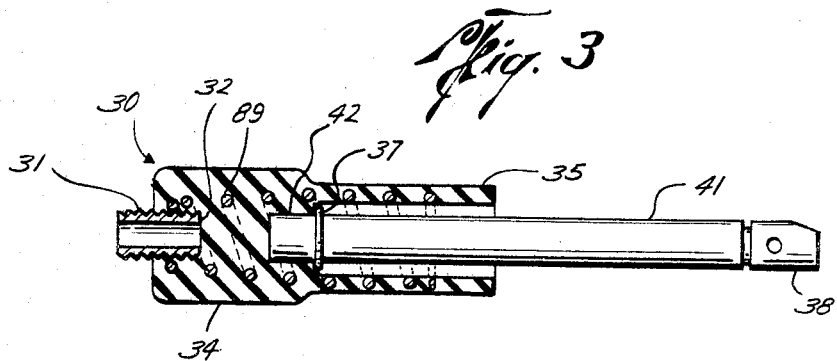
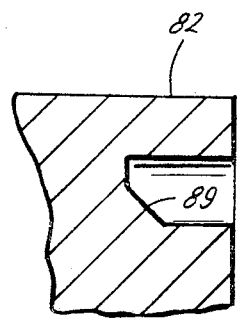
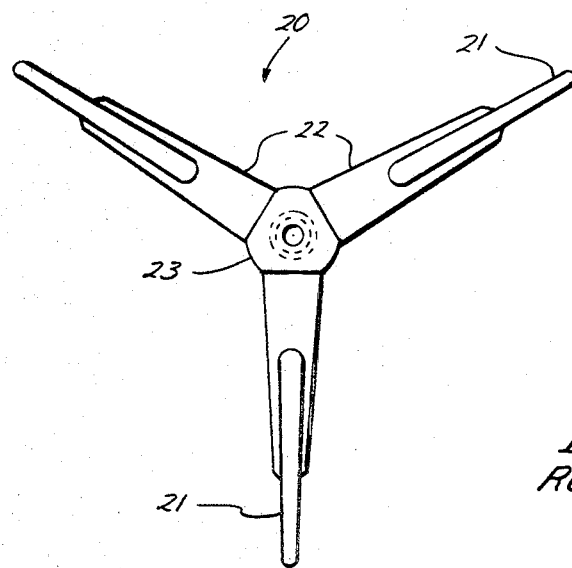
Donald J. McIver
Russell D. McClaid, Jr.
INVENTORS
BY Robert A. B. Dickinson
ATTORNEY

United States Patent Office 3,510,861
Patented May 5, 1970

---

3,510,861
BIN LEVEL INDICATOR
Donald J. McIver, Houston, and Russell D. McClaid, Jr., Brenham, Tex., assignors, by mesne assignments, to Keystone Valve Corp., Houston, Tex., a corporation of Texas
Filed Nov. 7, 1967, Ser. No. 681,229
Int. Cl. G08b *21/00*
U.S. Cl. 340—246
5 Claims

ABSTRACT OF THE DISCLOSURE

A device for indicating the level of material within a container. Rotatable and flexible vanes are connected to a shaft. This shaft is telescoped within a sleeve, both the shaft and sleeve being caused to rotate by a motor-gear arrangement. Switch trip means are provided to activate a switch, on the vanes encountering sufficient resistance, and thereby causing the sleeve and shaft to have a differential rotation.

BACKGROUND OF THE INVENTION

Field of the invention

This invention concerns devices designed to indicate the level of materials present within a bin or container. More particularly it concerns those indicating such a level by virtue of blades driven by a motor, wherein on the blades contacting the material present, this resistance may be translated into some operative action.

Description of the prior art

Numerous devices have been designed to indicate the level of material in a container. These have ranged from peep holes to sophisticated sensors. One area of past application has been to provide rotatable arms or vanes designed to ultimately contact the material when it reaches a certain level. On such contact occurring, certain acts may automatically take place, such as the driving force cutting itself off. However, such arrangements have generally permitted material from the bin to be transmitted without and thereby clog or otherwise increase the torque on the driving mechanism. Such clogging or increased torque results in a false "high level" signal as the switching mechanism is actuated by an increase in torque on the driving mechanism.

SUMMARY OF THE INVENTION

This invention provides for a utility of assembly in that rotatable vanes are made flexible relative to the axis of the vanes, permitting the blade assembly to be inserted into and/or withdrawn from a container without complete prior assembly or disassembly. These vanes are attached, as by bonding to a central hub, and the hub in turn is linked to a flexible linkage assembly. Such assembly serves to join the hub and vanes to a central shaft, yet permits an incremental rotation differential between the shaft and sleeve means encompassing the shaft, the sleeve means being rotated directly by a motor-related gear. This rotation differential permits rotation to be translated into axial movement of switch activating apparatus in the event of bin material reaching a certain level. Switch actuation is therefore entirely independent of torque on the drive mechanism and any clogging or increase in torque on the drive will not produce a false "high level" signal.

DESCRIPTION OF THE DRAWINGS

FIG. 1 is a vertical section through the housing, shaft and paddle wheel assembly taken along line B—B of FIG. 2;

FIG. 2 is an end elevation of the housing, parts of the cover being broken away;

FIG. 3 is an axial section through the drive shaft and linkage assembly;

FIG. 4 is a side elevation of the switch activating nipple;

FIG. 5 is a broken axial section through the gear lug; and

FIG. 6 is an end view of the vane and hub assembly.

DESCRIPTION OF A PREFERRED EMBODIMENT

Looking first at FIG. 1, a paddle wheel 20 includes a series of spaced vanes 21, each of which is linked to a central hub 23 by arms 22. The combination of vane and arm may be referred to as a blade. This wheel, and its components, is intended to be slowly rotated. On the level of material contained within a bin, or other container, rising to a level so as to impede such rotation, a signal is generated so as to cut off the supply of material or to take other desired action.

Hub 23 may include externally threaded member 24 which engages internally threaded coupling 25, said coupling, in turn, mating with externally threaded nipple 31 of the flexible linkage generally indicated at 30. A simplified method of joining paddle wheel 20 to the flexible linkage 30 may consist of forming coupling 25 as a simple internally threaded lug or extension of hub 23. While the paddle member may be fabricated of metal, a more suitable arrangement may provide for fabricating the vanes and arms of rubber or other flexible material and bonding them to the hub. This would promote ease of insertion and removal of the paddle wheel assembly within the bin without necessitating a lengthy shut down as might be required to remove the paddle wheel prior to insertion or removal of the housing. In other words, the vanes may collapse in an umbrella style.

Returning now to the drawings, coupling 25 removably joins nipple 31. This nipple has one end 32 fitted, as by press fitting into a cavity of body 34 of molded rubber linkage 30. Opposite body portion 34 extends a skirt portion 35. Shaft 41 has one end 42 fitted within said body 34. It should be noted that spacing exists between adjacent ends of nipple 31 and shaft 41, permitting a certain play in linkage 30 on a force being applied. Linkage skirt 35 is seen to encompass a substantial portion of shaft 41. Near end 42 of the shaft, snap ring 37 may limit linear movement of the shaft relative to linkage 30. Shaft 41 may have limited movement within sleeve 42. A series of washers 43 encircle shaft 41, within the confines of linkage skirt 35 and intermediate ring 37 and the adjacent end of sleeve 52. These absorb axial thrust and prevent the linkage skirt from bonding to the shaft. The free end of skirt 35 is fixed to sleeve 52 by clamping means such as illustrated by numeral 45.

Opposite linkage 30, shaft 41 is seen to extend within housing 60. This housing may include base plate 61 having a cylindrical lug-like extension 62, which may be threaded, as at 63, to permit engagement with a bin or other storage device. Shoulder 64 of lug 62 has washer 65 positioned there against, snap ring 66 encircling sleeve 42 to sealingly abut against said washer. Sealing means such as shaft seal 67 and needle bearing 68 and clutch bearing 69 are provided encirclingly around sleeve 42 within annular cavities provided within base lub 62. Hollow cover 71 may be affixed to base plate 61 in any conventional manner.

Gear 81 is carried near one end of sleeve 52 by virtue of cylindrical gear lug 82, said lug having spaced notches 89 therein for receiving portions of a nipple hereinafter described. These notches have at least one side thereof presenting a beveled surface, or one angularly inclined with respect to the lugs axis. Said gear lug 82 and shaft sleeve 52 are linked by pin means 83. Snap ring 84 is normally seated within an annular cavity provided therefore near one end of shaft 41 and normally abutting against the end of sleeve 42.

Motor 90, affixed conventionally to housing base 61, carries motor shaft 91, said shaft having a pinion 92 at one end in meshing relationship with gear 81. Switch 100 also is fixed relative to the housing plate and/or cover, and includes leaf actuator 101.

Nipple 110 is is generally cylindrical, with lug extensions 111 fitting within the aforementioned notches 89 in gear lug 82. Further, the nipple itself includes oppositely disposed notches 102 for receiving the ends of pin 88 extending through the end of shaft 41. Button 104 is positioned centrally of one face of nipple 110 to press against actuator 101.

Wire spring 89 is spirally wound within the linkage 30, to strengthen the linkage, and around one end of nipple 31, one end of shaft 41, and washers 43.

In operation, the indicator of this invention would be installed on a bin or container, with plate 61 affixed to the outer wall thereof and lug 62, paddle wheel 20 and linkage 30 extending within the container through suitable threaded aperture means provided therein. The flexible feature of the vanes render it unnecessary to remove them prior to insertion. Even so, the width of arms 22 (see FIG. 6) is sufficient to impart substantial strength in the direction of forces normally exerted by bin material. Motor 90, on being supplied current from a source not shown, will rotate pinion 92 through motor shaft 91. The pinion, in turn, will mesh with the teeth of gear 81 and cause its rotation. Rotation of gear 81 will cause its lug 82, sleeve 52 and nipple 110 to also rotate similarly. On the absence of any substantial resistance, such rotation will also cause like motion of shaft 41 by virtue of the ends of its pin 88 being received within notches 102 of nipple 110. Further, since linkage 30 connects, somewhat flexibility, one end of shaft 41 to paddle wheel 20, by virtue of intermediate nipple 31, rotation of shaft 41 will also cause movement of the paddle wheel and of its vanes 21.

Assume now that the motor is causing slow movement of pinion 92, gear 81, sleeve 52, nipple 110, shaft 41, linkage 30, nipple 31, coupling 25 and paddle wheel 20. Further assume that material, such as flour, being stored within the bin or container (not shown) reaches the height or level so as to tend to impede further rotary movement of vanes 21. Thus, motion of vanes 20, and thereby of paddle wheel 20 will be stopped. However, the motor will continue to cause rotation of gear 81 and sleeve 52. Because of the presence of flexible linkage 30, there may be some limited movement or twisting of shaft 41 relative to coupling 25 and stub shaft or threaded member 24. Since this movement is limited, shaft 41 will soon be substantially fixed in position, while gear 81 and sleeve may continue to be rotated by motor 90. However, this invention provides for differential movement of shaft 41 and sleeve 52 in response to torque. Thus, sleeve 52 may rotate somewhat in excess of shaft 41. Inasmuch as rotating motion of nipple 110 is substantially fixed relative to shaft 41 by virtue of pin 88 within slots 102, as gear lug 82 continues to rotate, the angular surface of lug notch 89 exerts a force against extensions 111 of nipple 110, thereby causing the nipple 110 to move axially away from gear 81 (to the right in FIG. 1). As it so moves, button 104 presses against leaf actuator 101 of switch 100. In other words, this differential movement involving shaft 41 and sleeve 52 may be translated into axial motion of nipple 110. Such activation may cause an audible signal to be given, shut off the supply of material to the bin, or such other operation as desired.

Although only a single embodiment has been described, it should be obvious that numerous modifications are possible by one skilled in the without departing from the spirit of the invention.

What is claimed is:

1. Device for determining the level of material within a container comprising:
   means for physically contacting said material on said material reaching a specific level:
   means for causing rotation of said contacting means, said rotation causing means including (a) motor means, (b) first shaft, (c) means coupling said motor to said first shaft, and (d) coupling means having a body and flexible skirt portion flexibly connecting said first shaft to said contacting means; and
   means for generating a signal as a function of said material reaching said specific level, said signal generating means including (a) second shaft member telescoped within said first shaft, but rotatable with respect thereto, (b) said second shaft member being joined to said body of said coupling means and thereby to said contacting means, and (c) means for translating rotational differential between said shafts into activation of a switching device.

2. The device of claim 1 and including means linking said first and second shaft members, and means causing said linking means to move axially with respect to one of said shaft members on said first shaft member rotating to a greater extent than said second shaft member.

3. The device of claim 2 and including means for translating said axial movement of said linking means into an electrical signal.

4. The device of claim 1 wherein said material contacting means includes a plurality of flexible blades having substantially greater strength in a direction normal to their direction of movement and in the plane of such movement than in a direction perpendicular to the plane of such movement.

5. The device of claim 1 wherein said rotation causing means further includes gear means linked to one of said shaft members and driven by said motor means.

References Cited

UNITED STATES PATENTS

| 1,873,353 | 8/1932 | Sperling | 340—246 |
| 2,698,362 | 12/1954 | Bozich | 340—246 |
| 2,851,553 | 9/1958 | Grostick | 340—246 |
| 2,909,766 | 10/1959 | Bozich | 340—246 |
| 2,913,710 | 11/1959 | Barber et al. | 340—246 |
| 3,210,495 | 10/1965 | Lau | 340—246 |

JOHN W. CALDWELL, Primary Examiner

D. MEYER, Assistant Examiner

U.S. Cl. X.R.

200—61.21